(12) United States Patent
Cable

(10) Patent No.: US 6,813,637 B2
(45) Date of Patent: Nov. 2, 2004

(54) SYSTEM AND METHOD FOR AUTOMATICALLY PARTITIONING AN APPLICATION BETWEEN A WEB SERVER AND AN APPLICATION SERVER

(75) Inventor: Laurence Cable, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 401 days.

(21) Appl. No.: 10/098,912

(22) Filed: Mar. 15, 2002

(65) Prior Publication Data

US 2003/0187946 A1 Oct. 2, 2003

(51) Int. Cl.[7] .............................................. G06F 15/16
(52) U.S. Cl. ...................... 709/226; 709/221; 709/201; 709/105
(58) Field of Search ................................ 709/100, 104, 709/105, 201, 215, 220, 221, 223, 226, 229

(56) References Cited

U.S. PATENT DOCUMENTS

| | | | |
|---|---|---|---|
| 5,915,113 A | | 6/1999 | McDonald et al. |
| 5,930,804 A | * | 7/1999 | Yu et al. .................... 707/104.1 |
| 6,125,363 A | * | 9/2000 | Buzzeo et al. ............... 707/100 |
| 6,397,217 B1 | | 5/2002 | Melbin |
| 6,606,708 B1 | * | 8/2003 | Devine et al. ............... 713/201 |
| 2002/0046240 A1 | * | 4/2002 | Graham et al. .............. 709/203 |
| 2002/0078103 A1 | * | 6/2002 | Gorman et al. .............. 707/530 |
| 2003/0158919 A1 | * | 8/2003 | Fomenko ..................... 709/220 |

OTHER PUBLICATIONS

James Duncan Davidson, Danny Coward, Java™ 2 Servlet Specification, v2.2, Dec. 17th, 1999.
Bill Shannon, Java™ Platform Enterprise Edition Specification, v1.3, Proposed Final Draft 3–Mar. 30, 2001.

* cited by examiner

Primary Examiner—B. James Peikari
(74) Attorney, Agent, or Firm—Meyertons Hood Kivlin Kowert & Goetzel, P.C.; B. Noël Kivlin

(57) ABSTRACT

A system and method for automatically partitioning application components of a web application between a web server and an application server. Both the web server computer and the application server computer may implement an application component container. A method for programmatically analyzing the application components to determining an appropriate partitioning of the application components between the web server and application server computers may be employed. A deployment computer system may be connected to the web server and application server computers through a network. After the application components have been analyzed to determine an appropriate partitioning of the application components between the web server and the application server, the deployment computer system may then automatically deploy the application components on the respective computer systems according to this determined partitioning.

31 Claims, 6 Drawing Sheets

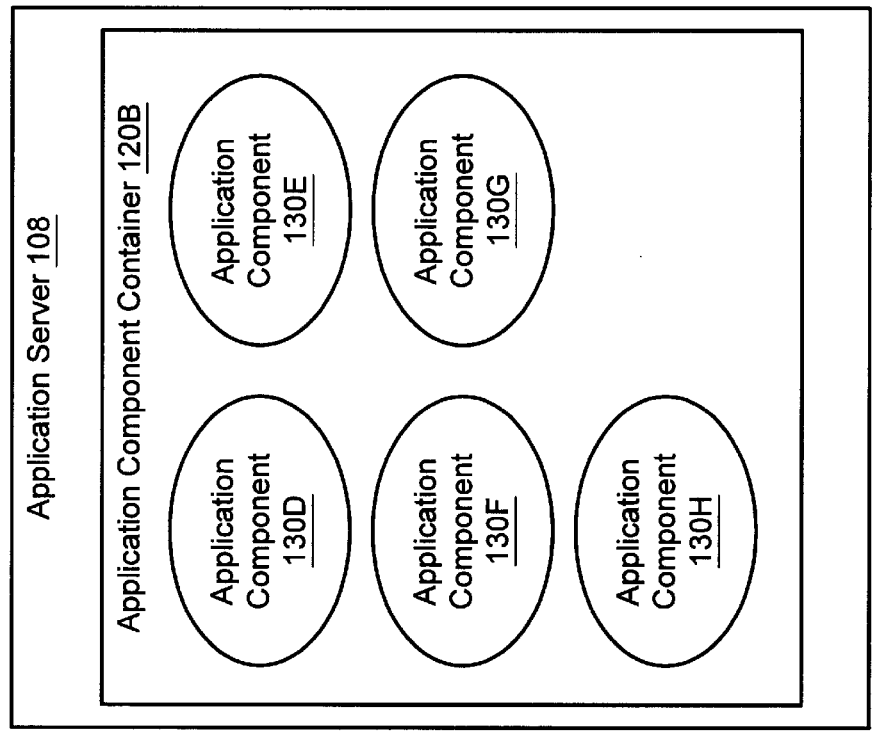
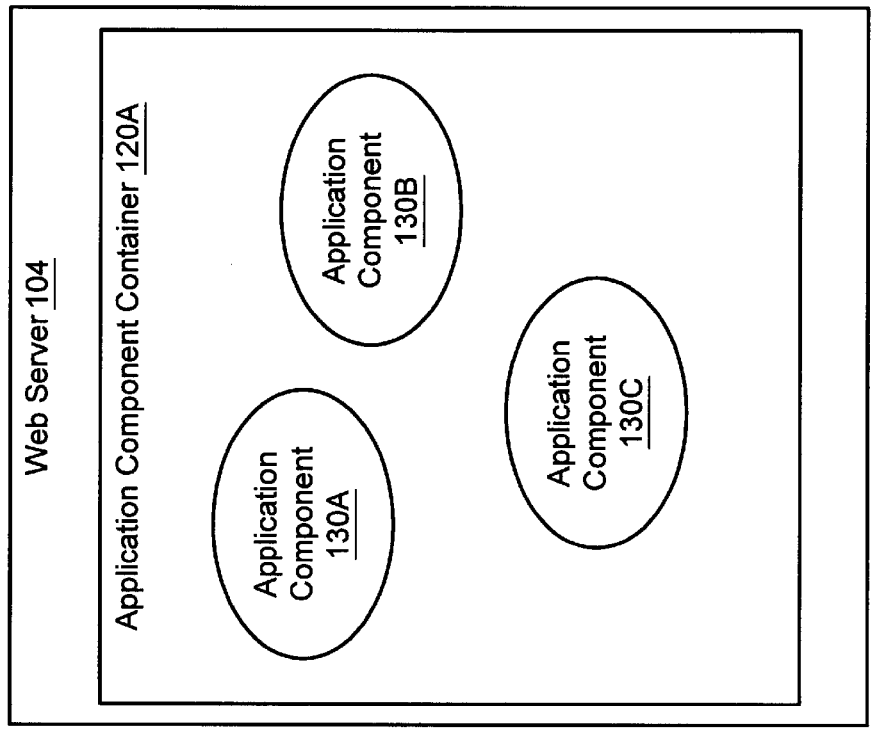
FIG. 2

SYSTEM AND METHOD FOR AUTOMATICALLY PARTITIONING AN APPLICATION BETWEEN A WEB SERVER AND AN APPLICATION SERVER

BACKGROUND OF THE INVENTION

1. Field of the Invention

The present invention relates to the field of networked applications, and more particularly to a system and method for automatically partitioning application components between a web server and an application server.

2. Description of the Related Art

The field of application servers has recently become one of the fastest-growing and most important fields in the computing industry. As web applications and other distributed applications have evolved into large-scale applications that demand more sophisticated computing services, specialized application servers have become necessary to provide a platform supporting these large-scale applications. Applications that run on application servers are generally constructed according to an N-tier architecture, in which presentation, business logic, and data access layers are kept separate. The application server space is sometimes referred to as "middleware", since application servers are often responsible for deploying and running the business logic layer and for interacting with and integrating various enterprise-wide resources, such as web servers, databases, and backend or legacy systems.

Application servers offer significant advantages over previous approaches to implementing web applications, such as using common gateway interface (CGI) scripts or programs. For example, application servers typically provide various application services for tasks that web applications and other networked applications commonly need to perform. Application servers often incorporate these services and components into an integrated platform specialized for creating web applications. The platform may leverage various standard software component models, such as the Common Object Request Broker Architecture (CORBA), the (Distributed) Component Object Model (COM/DCOM), Enterprise JavaBeans™ (EJB), etc., or the platform may provide its own software component model or may extend standard component models in various ways.

The following list is a partial list of the types of application services that application servers may provide. By leveraging these types of integrated, pre-built services, web application developers may realize a significant reduction in application development time and may also be able to develop a more robust, bug-free application. Application servers from different vendors differ, of course, in the types of services they provide; thus, the following list is exemplary only.

Application servers may provide data access services for accessing various types of databases, e.g. through directly supporting proprietary databases, such as SAP, Lotus Notes, PeopleSoft, etc., or through standardized interfaces, such as ODBC, JDBC, etc. Also, application servers may enable database connection pooling or caching.

Application servers may also provide services for accessing network directories, such as directories that support the standard Lightweight Directory Access Protocol (LDAP).

Application servers may also provide application security services. Web application security may be considered at different levels, such as: client-to-server communication, application-level privileges, database access, directory service access, etc. Application server security-related services may include support for performing user authentication, performing data encryption, communicating via secure protocols such as Secure Sockets Layer (SSL), utilizing security certificates, programming user access rights, integrating with operating system security, etc.

Application servers may also provide services enabling a web application to easily maintain user state information during a user session or across user sessions. Performing state and session management is especially important for applications that have complex, multi-step transactions.

Application servers may also support caching the results of application logic execution or caching the results of web page or application component output, so that for appropriate subsequent requests, the results may be reused.

Application servers may also support result streaming, such as dynamically streaming HTTP output, which may be especially useful for large result sets involving lengthy queries. A related service may enable an application to easily display a large result set by breaking the result set down into smaller groups and displaying these groups to the user one at a time.

Many web applications need to perform various types of searching or indexing operations. Application servers may also provide application services for indexing or searching various types of documents, databases, etc.

As noted above, many web applications may perform various types of complex, multi-step transactions. Application servers may also provide support for managing these application transactions. For example, this support may be provided via a software component model supported by the application server, such as the Enterprise JavaBeans™ component model, or via integration with third-party transaction process monitors, etc.

It is often desirable to enable web applications to perform certain operations independently, as opposed to in response to a user request. For example, it may be desirable for an application to automatically send a newsletter to users via email at regularly scheduled intervals. Application servers may support the creation and scheduling of events to perform various types of operations.

Many types of web applications need to perform e-commerce transactions, such as credit card transactions, financial data exchange, etc. Application servers may provide services for performing various types of e-commerce transactions or may provide an integrated third-party e-commerce package for applications to use.

Web applications often need to utilize various types of standard network application services, such as an email service, FTP service, etc. Application servers may provide these types of services and may enable applications to easily integrate with the services.

Web applications often need to log various conditions or events. Application servers may provide an integrated logging service for web applications to use.

Judging by the exemplary list above of computing services that application servers may provide for web applications or other networked applications, it is apparent that application servers may integrate a diverse range of services, where these services may interact with many different types of servers, systems, or other services. For example, an application server may act as a platform hub connecting web servers, database servers/services, e-commerce servers/services, backend or legacy systems, or any of various other types of systems or services. A benefit of many application servers is that they not only provide this service/system integration, but typically also provide centralized administrative or management tools for performing various aspects of system and application administration.

For example, application servers may provide management tools related to application development and deployment, such as tools for source code control and versioning, bug tracking, workgroup development, etc. Application servers may also provide tools related to application testing and deployment, such as tools for application prototyping, load simulation, dynamic code base updates, etc. Application servers may also provide tools for easily configuring the application to utilize various of the application server services described above. For example, administrators may use a tool to set the result caching criteria for particular application components or pages, or may use a tool to specify which documents to index or to specify indexing methods, etc.

One important class of application server administrative tools pertains to real-time application management and monitoring. Application servers may provide tools for dynamically managing various factors affecting application performance, e.g., by adjusting the application services and support features described above. For example, application server tools may allow administrators to:

dynamically adjust the number of database connections maintained in a database pool, in order to determine the optimum pool size for maximum performance clear or resize application output caches dynamically change various aspects of system or application security schedule or trigger events, such as events for sending e-mail reports to application users, generating reports based on collected data, etc.

start and stop various application services, such as email or FTP services, from a centralized user interface This list is, of course, exemplary, and particular application servers may support different types of centralized application management.

In addition to the factors discussed above, many application servers also include means for providing various types of system reliability and fault tolerance. One common technique related to fault tolerance is known as application server "clustering". Application server clustering refers to tying together two or more application servers into a system. In some cases, this "tying together" may mean that application code, such as particular software components, is replicated on multiple application servers in a cluster, so that in the case of a hardware or software failure on one application server, user requests may be routed to and processed by other application servers in the cluster.

Application server clustering may also facilitate application performance and scalability. Application servers may be added to a cluster in order to scale up the available processing power by distributing work. Advantageously, application servers often enable this type of scaling up to be down without requiring changes to the application code itself.

Work may be distributed across an application server cluster in different ways. For example, as discussed above, application code may be replicated across multiple application servers in the cluster, enabling a given request to be processed by any of these multiple application servers. Also, application code may be logically partitioned over multiple servers, e.g., so that a particular application server is responsible for performing particular types of operations. This type of application partitioning may help application performance in various ways. For example, application partitioning may reduce the need for an application server to perform context switching between different types of operations, such as CPU-intensive operations versus input/output-intensive operations. Also, application partitioning may be used to match application processing to various physical characteristics of a system, such as network characteristics. For example, data-intensive application logic may be configured to run on an application server that is closest to a data source, in order to reduce the latencies associated with accessing remotely located data.

In the case of application code replication, where multiple application servers are capable of processing a given request, it is often desirable to route the request to the "best" application server currently available to process the request. The "best" application server may, for example, be considered as the application server that will enable the request to be processed and the request results to be returned to the client as quickly as possible. On a broader scale, the "best" application server may be considered as the application server that will enhance some aspect of the performance of the overall application to the greatest possible extent. The mapping of client requests to application servers, which may use various algorithms and techniques, is known as "application server load balancing."

A web application may include various application components that can be referenced by uniform resource locators (URLs). For example, different application components may perform particular functions in response to user requests. The type of application component used may depend on the particular application server platform. Common types of application components include Java™ application components (e.g., JavaServer Pages™ (JSP) components, Java™ Servlet components, and Enterprise JavaBeans™ (EJB) components), CORBA components, ActiveX components, etc.

In prior art systems, web server computers typically receive client requests referencing these application components, e.g., from web browsers, and forward the requests to application server computers. The application server computer then executes the referenced application component. Thus, the web server(s) effectively becomes a multiplexor for incoming application component requests, simply redirecting the requests to the application server(s). This essentially makes the web server redundant for these requests and misses the opportunity to utilize the web server for increased scalability to improve application performance and throughput.

It would be desirable to instead deploy a portion of the application components on the web server, thus distributing the application and enabling greater scalability, performance and response. Of course, not all application components may be able to execute on the web server. For example, as described above, the application server may provide various services that the application components may utilize. Depending on which (if any) of these services a given application component utilizes, the application component may or may not be required to execute on the application server. It would thus be desirable to provide a system and method for automatically analyzing a set of application components to determine a subset of the application components that can execute on the web server and to partition the components between the web server and the application server accordingly.

SUMMARY OF THE INVENTION

The problems described above may in large part be solved by providing a system and method for automatically partitioning application components of a web application between a web server and an application server, such as described herein. In various embodiments, the application components may comprise any of various types of executable application components, such as Java™ application components (e.g., JavaServer Pages™ (JSP) components, Java™ Servlet components, and Enterprise JavaBeans™ (EJB) components), CORBA components, ActiveX components, C++ components, etc., or application components constructed according to a proprietary specification.

The system supporting the web application may comprise one or more web server computers connected to one or more application server computers. Both the web server computer(s) and the application server computer(s) may implement an application component container. As used herein, an application component container refers to a software framework that directly manages and supports the execution of application components. For example, in an embodiment in which the application components include Java™ application components, an application component container may comprise a container such as specified in the Java™ 2 Platform Enterprise Edition Specification, v1.3.

Some application components may be able to execute on the web server computer under management of its application component container. Other application components may need to execute on the application server computer under management of its application component container. For example, application components that need to execute on the application server computer may utilize services or resources available only from the application server computer. A method for programmatically analyzing the application components to determining an appropriate partitioning of the application components between the web server and application server computers may be employed. As used herein, programmatically analyzing the application components may include any technique or method implemented by a program that inspects or examines the application components or meta-information describing the application components. In various embodiments, this analysis may be performed in any of various ways, e.g., depending on the type of application components. One particular technique for analyzing components of a Java™ 2 Platform Enterprise Edition application is described.

As the web server computer receives a request from a client computer, the web server may treat the request differently, depending on the particular resource or application component the request references. For example, if the request references a document, such as an HTML document, then the web server may process the request itself, e.g., by retrieving the document from the web server's local file system or from a local cache and returning the document to the client computer. Similarly, if the request references an application component that is deployed on the web server computer, then the web server may invoke execution of the application component by the application component container implemented on the web server computer. If, on the other hand, the request references an application component that is deployed on the application server computer, then the web server may forward or redirect the request to the application server computer. The application server computer may then invoke execution of the referenced application component by the application component container implemented on the application server computer.

Thus, the system may improve application performance by increasing the degree of distribution of the application and improving the ability of the application server computer to service those requests that require services or information provided by the application server computer, allowing the web server computer to service those requests that do not require services or information provided by the application server computer.

In one embodiment, a deployment computer system may be connected to the web server and application server computers through a network. After the application components have been analyzed to determine an appropriate partitioning of the application components between the web server and the application server, the deployment computer system may then be operable to automatically deploy the application components on the respective computer systems according to this determined partitioning.

Deploying an application component on a computer system may comprise performing actions necessary to make that application component available for execution on the computer system. For example, for an application component that needs to be deployed on the application server computer, deploying the application component may involve copying one or more files representing the application component onto a file system of the application server computer. For example, the application component may be stored on the deployment computer system or on a file system accessible to the deployment computer system, and it may be necessary to move the application component to a file system of the application server computer. In various embodiments, deploying the application component may also involve updating information of the respective computer system, such as database or registry information, to enable the computer system to invoke the application component in response to client requests referencing that component.

BRIEF DESCRIPTION OF THE DRAWINGS

A better understanding of the present invention can be obtained when the following detailed description is considered in conjunction with the following drawings, in which:

FIG. 2 illustrates an application in which application components are partitioned between a web server and an application server;

Figure 1:
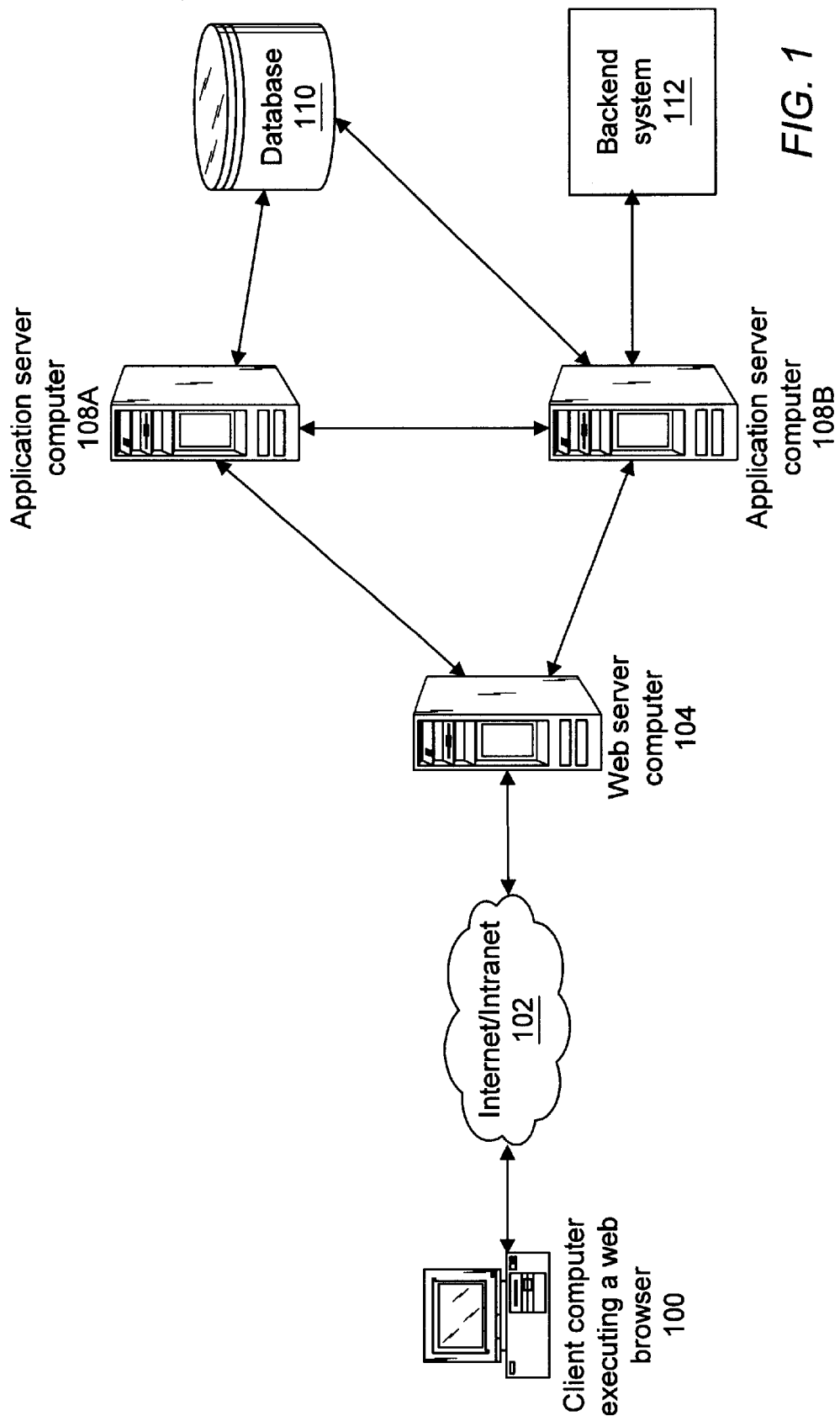
FIG. 1 illustrates an exemplary architecture for a web application that utilizes application servers.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIGS. 1 and 2: Exemplary Application Architecture

FIG. 1 illustrates an exemplary architecture for a web application that utilizes application servers. There are many possible architectural variations, and FIG. 1 is exemplary only. In general, a web application may be defined as an Internet or Intranet-based application comprising a collection of resources that are accessible through uniform resource locators (URLs). The resources may include web pages comprising HTML, XML, scripting code such as Javascript or VBScript, or other types of elements. The resources may also include any of various types of executable application components 130, such as Java™ application components (e.g., JavaServer Pages™ (JSP) components, Java™ Servlet components, and Enterprise JavaBeans™ (EJB) components), CORBA components, ActiveX components, C++ components, etc., or application components constructed according to a proprietary specification. The resources may also include any other type of resource addressable through a URL.

The embodiment of FIG. 1 illustrates a client computer 100 executing a web browser, such as the Netscape Navigator or Microsoft Internet Explorer web browsers. It is noted that the web-browser need not be a web browser per se, but may be any of various types of client-side applications that include web-browsing functionality. For example, Microsoft Corp. provides programming interfaces enabling applications to incorporate various web-browsing capabilities provided by the Microsoft Internet Explorer code base.

The web browser may execute in any type of client computer 100. For example, the web browser may execute in a desktop computer or workstation running any of various operating systems, such as Windows, Mac OS, Unix, etc., or the web browser may execute in a portable computing device, such as a personal data assistant, smart cellular phone, etc., or the web browser may execute in any other type of computer system. The client computer 100 may use a network connection for communicating with a web server computer 104 via a network 102, such as the Internet or an Intranet. Although a single web server computer 104 is shown in FIG. 1, in various embodiments any number of web server computers 104 may be present, and incoming requests may be distributed among these web server computers.

The client network connection may be a connection of any type, such as a PPP or SLIP dialup link, an Ethernet or token ring connection, an ISDN connection, a cable modem connection, any of various types of wireless connections, etc. Although web applications are often associated with particular communication protocols, such as HTTP or SSL, it is noted that any communication protocol, including TCP-based protocols and UDP-based protocols, may be used to communicate over the network 102.

The system of FIG. 1 also includes one or more application server computers 108. The web server computer(s) 104 may interface with the application server computer(s) 108 using various techniques, e.g., through an in-process extension, such as an ISAPI or NSAPI extension.

As shown in FIG. 2, application components 130 may be partitioned between the web server(s) and the application server(s). Both the web server computer(s) 104 and the application server computer(s) 108 may implement one or more application component containers 120. As used herein, an application component container refers to a software framework that directly manages and supports the execution of application components 130. For example, in an embodiment in which the application components 130 include Java™ application components, an application component container may comprise a container such as specified in the Java™ 2 Platform Enterprise Edition Specification, v1.3.

As described above and shown in FIG. 2, some application components 130 (e.g., 130A, 130B, and 130C) may be able to execute on the web server computer 104, under management of the application component container 120A. Other application components (e.g., 130D, 130E, 130F, 130G, and 130H) may need to execute on the application server computer 108, under management of the application component container 120B. One embodiment of a method for automatically partitioning the application components 130 among the web server and application server computers is described below.

Thus, as the web server computer 104 receives a request from a client computer 100, the web server may treat the request differently, depending on the particular resource or application component the request references. For example, if the request references a document, such as an HTML document, then the web server may process the request itself, e.g., by retrieving the document from the web server's local file system or from a local cache and returning the document to the client computer. Similarly, if the request references an application component 130 that is deployed on the web server computer 104, then the web server may invoke execution of the application component by the application component container 120A. If, on the other hand, the request references an application component 130 that is deployed on the application server computer 108, then the web server may forward or redirect the request to the application server computer 108. The application server computer 108 may then invoke execution of the referenced application component by the application component container 120B.

Thus, the system shown in FIGS. 1 and 2 may improve application performance by increasing the degree of distribution of the application and improving the ability of the application server computer 108 to service those requests that require services or information provided by the application server computer 108.

The application server computers 108 may be configured as a part of an application server cluster, as described above. Although FIG. 1 illustrates an application server cluster with only two application servers, it is noted that the cluster may comprise any number of application servers. Each application server may interface with various types of other servers or systems. For example, as illustrated in FIG. 1, the application servers may communicate with a database 110. Each application server in the cluster may interface with the same systems, or the application servers may differ in which systems they interface with. For example, in FIG. 1, application server computer 108B is shown to interface with a backend or legacy system 112, such as a CICS, R/3, PeopleSoft, or other type of backend system. Application server computers in a cluster may not need to be in close physical proximity to each other.

As noted above, FIG. 1 is an exemplary architecture, and many variations are possible. As a small handful of examples of alternative embodiments, multiple web servers may be present to receive requests from client computers and broker the requests to application servers, the web server may itself interface directly with a database, application servers may interface with various other types of systems, such as specialized authentication servers, e-commerce servers, other types of legacy systems, etc.

Figure 3:
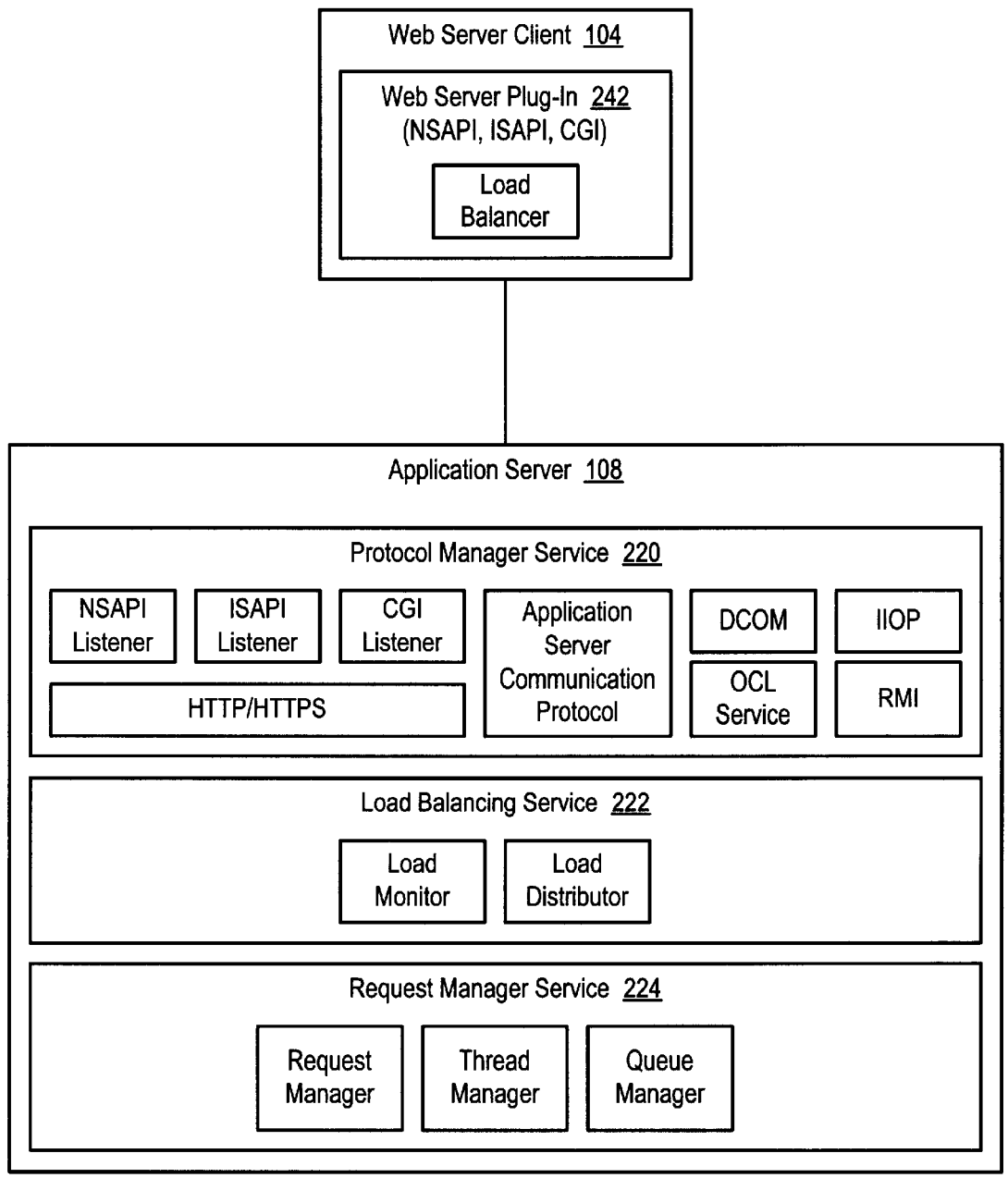
FIG. 3 illustrates exemplary system-level services that may execute in one embodiment of an application server.

FIG. 3—Application Server System-Level Services

FIG. 3 illustrates several system-level services which may execute in one embodiment of an application server 108. These system-level services may be involved in managing requests received by the application server. FIG. 3 is intended to be exemplary only, and in other application server embodiments, requests may be processed in any of various other ways.

FIG. 3 illustrates a protocol manager service 220. The protocol manager service 220 is responsible for managing network communication between the application server 230 and clients of the application server. For example, FIG. 3 illustrates a web server client 104 which comprises a standard web server extension or plug-in 242. The web server plug-in 242 may be any of various well-known types of plug-ins enabling web servers to communicate with other systems, including NSAPI, ISAPI, optimized CGI, etc. As shown, the protocol manager service 220 includes "listener" modules or components, e.g., an NSAPI listener, ISAPI listener, etc., for communicating with the web server plug-in. The listener modules may communicate with the web server plug-in via the standard HTTP or HTTPS protocols, or any other communication protocol.

As shown in FIG. 3, the application server 108 may also include a load balancing service 222. In the case of application server clustering, requests may first be processed by the load balancing service in order to determine whether the request should be processed by the current application server or would be better served by re-directing the request to another application server in the cluster.

As shown in FIG. 3, the application server 108 may also include a request manager service 224. Once the load balancing service determines that the current application server should process the client request (if load balancing is applicable), the request manager service may be responsible for managing the processing of the request. As shown in FIG. 3, the request manager service 224 may include several components or modules, such as a request manager, a thread manager, and a queue manager. In one embodiment, client requests may be processed in a multi-threaded fashion. The thread manager module may manage a pool of threads available for processing requests. In one embodiment, the number of threads in the pool may be adjusted using an administrative tool.

When the request manager module receives a client request, the request manger module may call the thread manager module to attempt to assign the client request to a thread. If no threads are currently available, then the request manager module may call the queue manager module to queue the request until a thread becomes available. The queue manager module may maintain information regarding each client request, such as the request ID, the processing status, etc.

Figure 4:
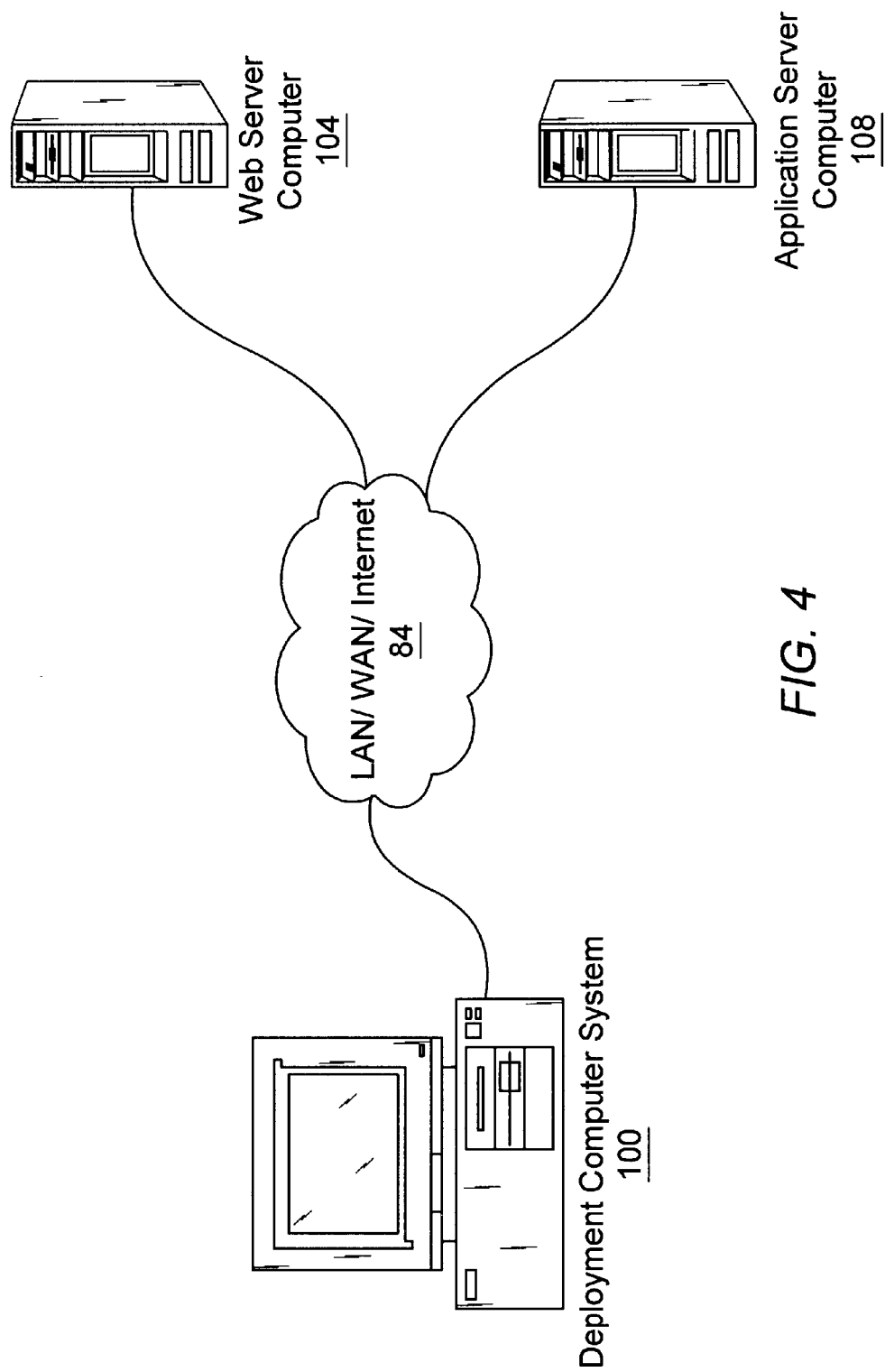
FIG. 4 illustrates a deployment computer system operable to automatically deploy application components on a web server and an application server.

FIG. 4—Deployment Computer System

As described above, it may be desirable to partition application components 130 between a web server computer 104 and an application server computer 108. In one embodiment, the application components 130 may be automatically deployed on the web server and application server computers by a deployment computer system 100, such as shown in FIG. 4. The deployment computer system 100 may be connected to the web server computer 104 and the application server computer 108 through a network 84, such as a LAN, WAN, the Internet, an Intranet, etc. Although a single web server computer 104 and application server computer 108 are shown in FIG. 4, in other embodiments any number of these computer systems may be present, as described above. Also, the deployment computer system 100 may be connected to the web server computer 104 and the application server computer 108 through the same network or through different networks.

The application components 130 may be analyzed as described below to determine an appropriate partitioning of the application components 130 between the web server and the application server. The deployment computer system 100 may then be operable to deploy the application components on the respective computer systems according to this determined partitioning. Deploying an application component on a computer system may comprise performing actions necessary to make that application component available for execution on the computer system. For example, for an application component 130 that needs to be deployed on the application server computer 108, deploying the application component may involve copying one or more files representing the application component onto a file system of the application server computer 108. For example, the application component may be stored on the deployment computer system 100 or on a file system accessible to the deployment computer system 100, and it may be necessary to move the application component to a file system of the application server computer 108. In various embodiments, deploying the application component may also involve updating information of the respective computer system, such as database or registry information, to enable the computer system to invoke the application component in response to client requests referencing that component.

The deployment computer system 100 may be a computer system of any type. In FIG. 4, the deployment computer system 100 is shown as a separate computer system. For example, the application components 130 may be developed and tested on a separate deployment computer system 100 before actual use. In alternative embodiments, there may not be a separate deployment computer system 100. For example, either of the web server computer 104 or the application server computer 108 may execute a deployment tool operable to perform the function of deploying the application components 130 for actual use.

As described above, after a desired partitioning of the application components 130 between the web server computer 104 and the application server computer 108 has been determined, the application components may be automatically deployed among these computer systems by the deployment computer system 100. However, it is noted that in an alternative embodiment, the application components 130 may be manually deployed, if desired. For example, for each application component, an application developer may manually perform steps necessary for the application component to execute on the desired computer system, e.g., by manually copying files to their appropriate locations, etc. In this instance, the analysis of how the application components 130 are to be partitioned may still be determined programmatically by executing software operable to perform the analysis, and the application components may then be deployed manually according to the results of the analysis.

Figure 5:
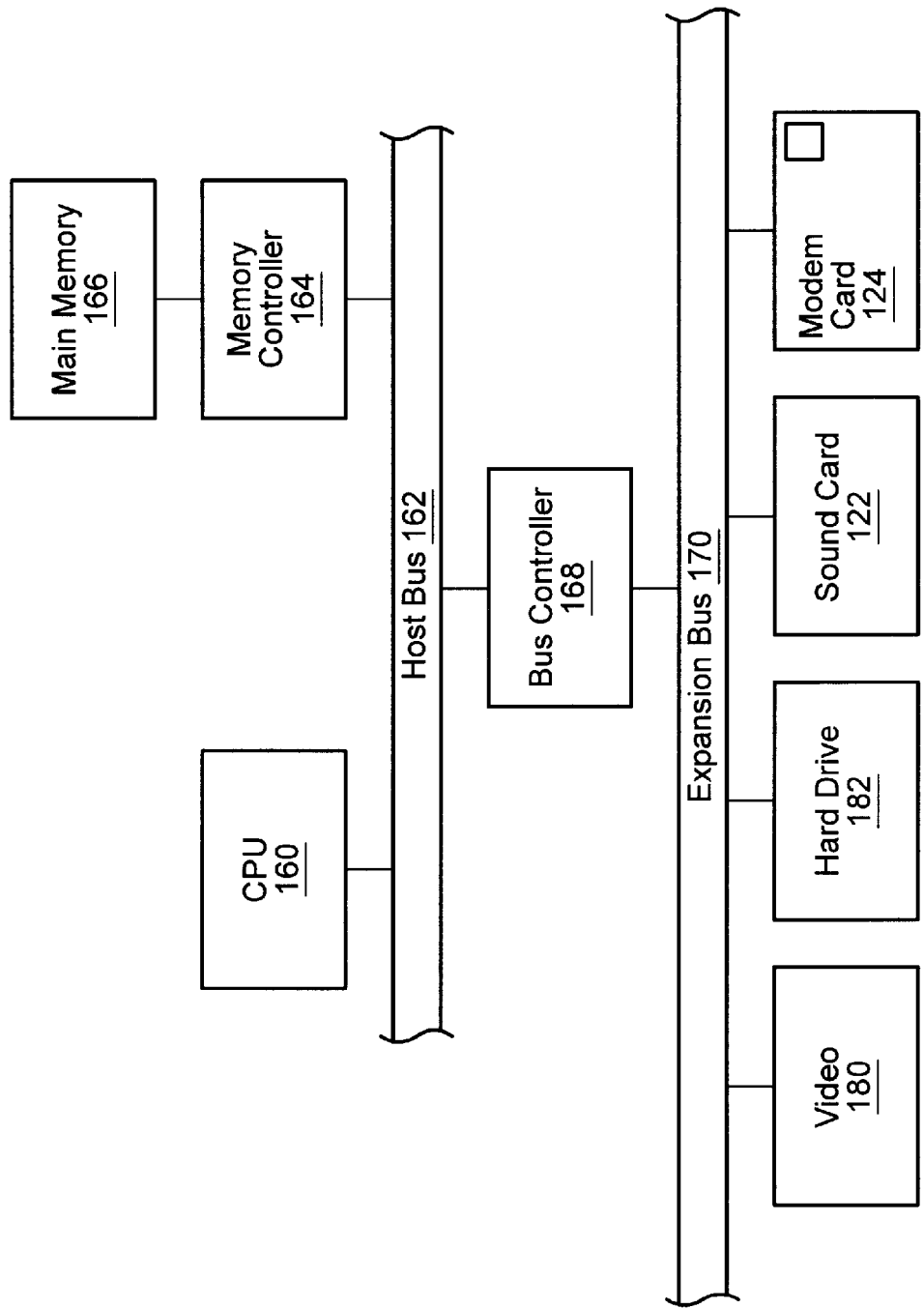
FIG. 5 is a block diagram illustrating one embodiment of the deployment computer system shown in FIG. 4.

FIG. 5—Deployment Computer System Block Diagram

FIG. 5 is a block diagram illustrating one embodiment of the deployment computer system 100 shown in FIG. 4. Elements of a computer not necessary to understand the present disclosure have been omitted for simplicity. It is noted that any type of computer system configuration or architecture can be used as desired, and FIG. 5 illustrates a representative PC embodiment.

The computer may include at least one central processing unit or CPU 160 which is coupled to a processor or host bus 162. The CPU 160 may be any of various types, including an x86 processor, e.g., a Pentium class, a PowerPC processor, a CPU from the SPARC family of RISC processors, as well as others. Main memory 166 is coupled to the host bus 162 by means of memory controller 164.

The host bus 162 is coupled to an expansion or input/output bus 170 by means of a bus controller 168 or bus bridge logic. The expansion bus 170 may be any type of bus, including the PCI (Peripheral Component Interconnect) expansion bus. The expansion bus 170 includes slots for various devices such as a sound card 122 and a modem card 124. The computer further includes a video display subsystem 180 and hard drive 182 coupled to the expansion bus 170.

The main memory 166 may store operating system software as well as other software for operation of the computer system. The main memory 166 may also store software operable to perform the method described below, e.g., to programmatically analyze a set of application components to determine a desired partitioning of application components between a web server computer system and an application server computer system. The main memory 166 may also store software operable to automatically deploy the application components on these computer systems according to the determined partitioning. It is noted that such software may also be stored in a second different computer that connects to the deployment computer system over a network, such as the Internet. In the latter instance, the second computer may provide the program instructions to the deployment computer system for execution.

Also, in various embodiments, computer program instructions and/or data operable to perform the functions described above may be received, sent, or stored upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Figure 6:
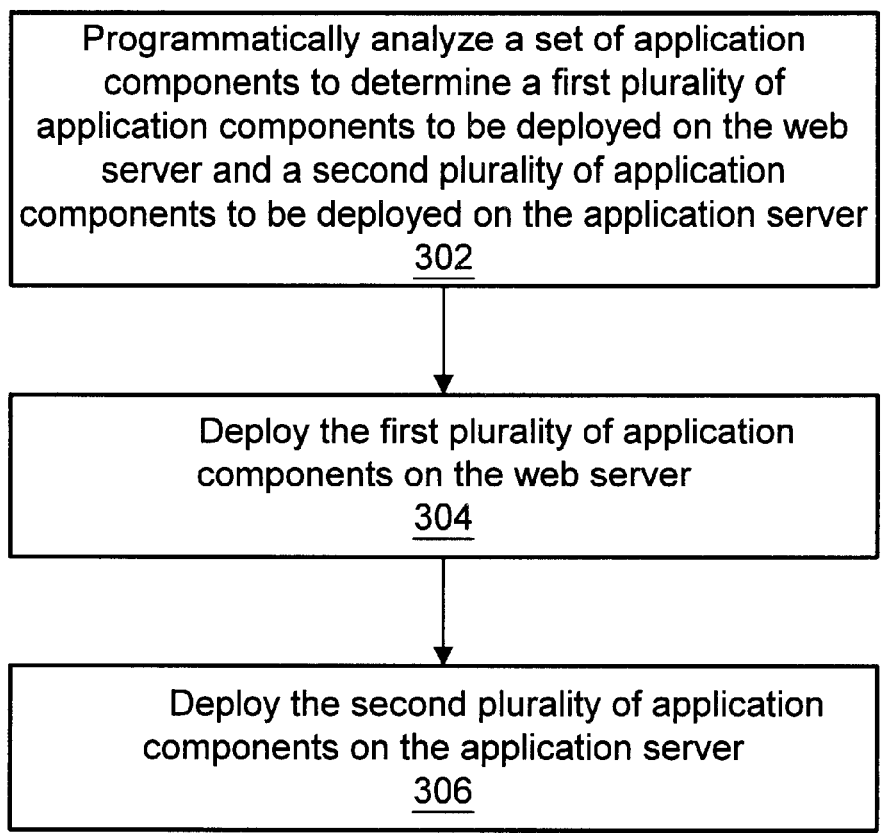
FIG. 6 is a flowchart diagram illustrating one embodiment of a method for partitioning application components between a web server computer and an application server computer.

FIG. 6—Method for Partitioning Application Components

FIG. 6 is a flowchart diagram illustrating one embodiment of a method for partitioning application components between a web server computer and an application server computer. In one embodiment, the method of FIG. 6 may be programmatically performed by the deployment computer system 100 described above.

In step 302, a set of application components may be programmatically analyzed to determine a first plurality of application components to be deployed on the web server and a second plurality of application components to be deployed on the application server. As used herein, programmatically analyzing the application components may include any technique or method implemented by a program that inspects or examines the application components or meta-information describing the application components. Depending on the type of application, the application components may be components of any type, including Java™ application components, CORBA components, ActiveX components, C++ components, etc. Thus, in various embodiments, the analysis may be performed in any of various ways.

In one embodiment, the application may be a Java™ 2 Enterprise Edition (J2EE™) application, and the application components may comprise Java™ application components, such as JavaServer Pages™ (JSP) components, Java™ Servlet components, and Enterprise JavaBeans™ (EJB) components. The EJB components typically need to execute in the application component container 120B implemented by the application server, since these components may utilize services provided by the application server that the web server does not provide. However, a portion of the JSP and Servlet components may be able to execute in the application component container 120A implemented by the web server.

As described in the Java™ 2 Platform Enterprise Edition Specification, v1.3, a J2EE™ application includes a "Web ARchive (WAR)" file, which includes a file named "web.xml". The "web.xml" file includes meta-data describing JSP and Servlet components for the application. This meta-data is formatted as Extensible Markup Language (XML) data describing each component. For example, a Servlet description may include tags such as an <init-param> tag that describes initialization parameters for the Servlet, a <load-on-startup> tag that indicates whether the Servlet should be loaded by the container upon startup of the application, etc. Thus, the method may operate to analyze the XML descriptions to determine whether each application component needs to execute in the application component container 120B implemented by the application server, or whether the application component can execute in the application component container 120A implemented by the web server.

For example, the "web.xml" file may include a list of references to EJB components, and each Java™ class file in the WAR that uses an EJB may include a reference to the EJBObject subinterface. By analyzing the EJBs listed in the "web.xml" file and inspecting each of the class files in the WAR for references to EJBObject/EJBHome subinterfaces, the method may determine which Servlets and JSPs access EJB components. Thus, the method may determine a first plurality of Servlets and JSPs that do access EJB components and thus need to be deployed in the application component container 120B implemented by the application server. Similarly, the method may determine a second plurality of Servlets and JSPs that do not access EJB components and thus may be deployed in the application component container 120A implemented by the web server.

In step 304, the first plurality of application components may be deployed on the web server, and in step 306, the second plurality of application components may be deployed on the application server. The application components may be deployed automatically or manually, as described above with reference to FIG. 4.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for partitioning application components between a web server and an application server, the method comprising:

analyzing a set of application components to determine a first plurality of application components to be deployed on the web server and a second plurality of application components to be deployed on the application server;

deploying the first plurality of application components on the web server;

deploying the second plurality of application components on the application server;

wherein, in response to receiving a first request referencing a first application component in the first plurality of application components, the web server is operable to execute the first application component;

wherein, in response to receiving a second request referencing a second application component in the second plurality of application components, the web server is operable to forward the second request to the application server, wherein the application server is operable to execute the second application component.

2. The method of claim 1,
wherein said analyzing the set of application components comprises programmatically analyzing the set of application components.

3. The method of claim 1,
wherein said analyzing the set of application components comprises analyzing meta-information describing the set of application components.

4. The method of claim 1, further comprising:
executing a computer program operable to perform said analyzing the set of application components;
wherein the computer program is also operable to perform said deploying the first plurality of application components on the web server and to perform said deploying the second plurality of application components on the application server.

5. The method of claim 1,
wherein the web server implements a first application component container;
wherein the application server implements a second application component container;
wherein the first application component container is operable to execute application components from the first plurality of application components;
wherein the second application component container is operable to execute application components from the second plurality of application components.

6. The method of claim 1,
wherein the set of application components is a set of Java™ application components.

7. The method of claim 6,
wherein the set of Java™ application components comprises one or more JavaServer Pages™ (JSP) components.

8. The method of claim 6,
wherein the set of Java™ application components comprises one or more Java™ Servlet components.

9. A method for partitioning a Java™ 2 Enterprise Edition (J2EE™) application across multiple computer systems, the method comprising:
implementing a first Java™ application component container on a web server computer;
implementing a second Java™ application component container on a J2EE™ application server computer;
analyzing a set of Java™ application components to determine a first plurality of Java™ application components to be deployed on the web server computer and a second plurality of Java™ application components to be deployed on the J2EE™ application server computer;
wherein the first Java™ application component container is operable to execute Java™ application components from the first plurality of Java™ application components;
wherein the second Java™ application component container is operable to execute Java™ application components from the second plurality of Java™ application components.

10. The method of claim 9,
wherein, in response to receiving a first request referencing a first Java™ application component from the first plurality of Java™ application components, the web server computer is operable to execute the first Java™ application component in the first Java™ application component container;
wherein, in response to receiving a second request referencing a second Java™ application component from the second plurality of Java™ application components,
the web server computer is operable to forward the second request to the J2EE™ application server computer, wherein the J2EE™ application server computer is operable to execute the second Java™ application component in the second Java™ application component container.

11. The method of claim 9, further comprising:
deploying the first plurality of Java™ application components on the web server computer;
deploying the second plurality of Java™ application components on the J2EE™ application server computer.

12. The method of claim 9,
wherein said analyzing the set of Java™ application components comprises programmatically analyzing the set of Java™ application components.

13. The method of claim 9,
wherein said analyzing the set of Java™ application components comprises analyzing meta-information describing the set of Java™ application components.

14. The method of claim 9, further comprising:
executing a computer program operable to perform said analyzing the set of Java™ application components;
wherein the computer program is also operable to deploy the first plurality of Java™ application components on the web server computer and to deploy the second plurality of Java™ application components on the J2EE™ application server computer.

15. The method of claim 9,
wherein the set of Java™ application components comprises one or more JavaServer Pages™ (JSP) components.

16. The method of claim 9,
wherein the set of Java™ application components comprises one or more Java™ Servlet components.

17. The method of claim 9,
wherein said analyzing the set of Java™ application components comprises analyzing information describing the Java™ application components in a web.xml file of a Web ARchive (WAR) file for the J2EE™ application.

18. The method of claim 9,
wherein the first plurality of Java™ application components to be deployed on the web server computer comprise one or more Java™ Servlet components that do not reference Enterprise JavaBeans™ (EJB) application components;
wherein the second plurality of Java™ application components to be deployed on the J2EE™ application server computer comprise one or more Java™ Servlet components that do reference Enterprise JavaBeans™ (EJB) application components.

19. A system for implementing a Java™ 2 Enterprise Edition (J2EE™) application, the system comprising:
a web server computer that implements a first Java™ application component container;
a J2EE™ application server computer that implements a second Java™ application component container, wherein the J2EE™ application server computer is coupled to the web server computer via a network;
a first plurality of Java™ application components deployed on the web server computer, wherein the first Java™ application component container is operable to execute Java™ application components from the first plurality of Java™ application components;
a second plurality of Java™ application components deployed on the J2EE™ application server computer, wherein the second Java™ application component container is operable to execute Java™ application components from the second plurality of Java™ application components.

20. The system of claim 19,
wherein, in response to receiving a first request referencing a first Java™ application component from the first plurality of Java™ application components, the web server computer is operable to execute the first Java™ application component in the first Java™ application component container;
wherein, in response to receiving a second request referencing a second Java™ application component from the second plurality of Java™ application components, the web server computer is operable to forward the second request to the J2EE™ application server computer, wherein the J2EE™ application server computer is operable to execute the second Java™ application component in the second Java™ application component container.

21. The system of claim 19, further comprising:
a deployment computer system connected to the web server computer and the J2EE™ application server computer via a network;
wherein the deployment computer system is operable to deploy the first plurality of Java™ application components on the web server computer;
wherein the deployment computer system is operable to deploy the second plurality of Java™ application components on the J2EE™ application server computer.

22. The system of claim 21,
wherein the deployment computer system includes a memory storing program instructions executable to analyze the Java™ application components to determine which Java™ application components to deploy on the web server computer and which Java™ application components to deploy on the J2EE™ application server computer.

23. The system of claim 22,
wherein, in performing said analyzing the Java™ application components, the program instructions are executable to analyze information describing the Java™ application components in a web.xml file of a Web ARchive (WAR) file for the J2EE™ application.

24. A carrier medium comprising program instructions, wherein the program instructions are computer-executable to:
programmatically analyze a set of application components to determine a first plurality of application components to be deployed on the web server and a second plurality of application components to be deployed on the application server;
deploy the first plurality of application components on the web server;
deploy the second plurality of application components on the application server;
wherein, in response to receiving a first request referencing a first application component in the first plurality of application components, the web server is operable to execute the first application component;
wherein, in response to receiving a second request referencing a second application component in the second plurality of application components, the web server is operable to forward the second request to the application server, wherein the application server is operable to execute the second application component.

25. The carrier medium of claim 24,
wherein said analyzing the set of application components comprises analyzing meta-information describing the set of application components.

26. The carrier medium of claim 24,
wherein the set of application components is a set of Java™ application components;
wherein analyzing the set of Java™ application components comprises analyzing information describing the Java™ application components in a web.xml file of a Web ARchive (WAR) file for a J2EE™ application.

27. The carrier medium of claim 24,
wherein the set of application components is a set of Java™ application components;
wherein the application server is a J2EE™ application server;
wherein the first plurality of application components comprises a first plurality of Java™ Servlet components to be deployed on the web server that do not reference Enterprise JavaBeans™ (EJB) application components;
wherein the second plurality of application components comprises a second plurality of Java™ Servlet components to be deployed on the J2EE™ application server that do reference Enterprise JavaBeans™ (EJB) application components.

28. A system for partitioning application components between a web server and an application server, the system comprising:
means for programmatically analyzing a set of application components to determine a first plurality of application components to be deployed on the web server and a second plurality of application components to be deployed on the application server;
means for deploying the first plurality of application components on the web server;
means for deploying the second plurality of application components on the application server;
wherein, in response to receiving a first request referencing a first application component in the first plurality of application components, the web server is operable to execute the first application component;
wherein, in response to receiving a second request referencing a second application component in the second plurality of application components, the web server is operable to forward the second request to the application server, wherein the application server is operable to execute the second application component.

29. The system of claim 28,
wherein the means for programmatically analyzing the set of application components comprises means for programmatically analyzing meta-information describing the set of application components.

30. The system of claim 28, further comprising:
means for deploying the first plurality of application components on the web server and means for deploying the second plurality of application components on the application server.

31. The system of claim 28,
wherein the web server implements a first application component container;
wherein the application server implements a second application component container;
wherein the first application component container is operable to execute application components from the first plurality of application components;
wherein the second application component container is operable to execute application components from the second plurality of application components.

* * * * *